United States Patent [19]

Hampton

[11] 4,089,454
[45] May 16, 1978

[54] APPARATUS FOR AND PROCESS OF FABRICATION OF ELONGATED AND CYLINDRICAL STRUCTURES

[75] Inventor: J. D. Hampton, Tulsa, Okla.

[73] Assignee: John Zink Company, Tulsa, Okla.

[21] Appl. No.: 761,396

[22] Filed: Jan. 21, 1977

[51] Int. Cl.² .............................................. B23K 31/06
[52] U.S. Cl. .............................. 228/173 A; 228/173 F; 228/15.1; 228/44.5
[58] Field of Search ........... 228/173 R, 173 A, 173 F, 228/15.1, 44.5; 29/445; 72/367

[56] References Cited

U.S. PATENT DOCUMENTS

| | | | |
|---|---|---|---|
| 2,500,204 | 3/1950 | Ronay | 228/44.5 |
| 2,525,680 | 10/1950 | Ingemarson | 269/48.1 X |
| 2,830,551 | 4/1958 | Miller | 269/48.1 X |
| 3,270,411 | 9/1966 | Thomas | 228/173 F |
| 3,284,883 | 11/1966 | Haverfield | 228/44.5 X |
| 3,422,519 | 1/1969 | Fehlman | 228/44.5 X |

*Primary Examiner*—Donald G. Kelly
*Attorney, Agent, or Firm*—Head, Johnson & Chafin

[57] ABSTRACT

In the process of assembling long, large diameter cylinders by welding together two or more relatively short cylinders of the same diameter, apparatus for facilitating the butt welding of the two cylinders comprises, a substantially horizontal boom which is supported by a horizontal trolley attached to a first vertical wall. Two circular cylindrical shells are rolled from sheets of the same width and to substantially the same diameter. They are supported on a plurality of pairs of rollers, which are adapted to coaxially support the two cylinders end to end. The boom includes at its outer end a hydraulic cylinder and piston, with the piston carrying a face plate, with the face concave and of the same radius of curvature as the cylinders. There is a second support wall on the side of the cylinders opposite to the boom, so that a force can be exerted by the piston against the cylinders, to reduce the horizontal diameter of one so as to match that of the other. When they are the same diameter along a selected diameter, tack welds are provided at opposite ends of the diameter. The assembly of the two component cylinders is then rotated on the rollers until a point is reached where one or the other of the two cylinders is larger in diameter. The boom is then moved along the trolley opposite the wider cylinder, which is compressed until it matches the diameter of the narrower one. When they are the same diameter the diametral points are tack welded, and so on.

7 Claims, 5 Drawing Figures

APPARATUS FOR AND PROCESS OF FABRICATION OF ELONGATED AND CYLINDRICAL STRUCTURES

BACKGROUND OF THE INVENTION

1. Field of the Invention

This invention lies in the field of apparatus for facilitating the construction of long cylindrical vessels. More particularly it concerns apparatus for facilitating the process of welding two or more relatively short cylinders of rolled steel plate, of substantially the same diameter, that may not be perfectly circular.

2. Description of the Prior Art

In the prior art, it has been customary to weld a plurality of short cylinders in butt welding in coaxial position so as to construct and fabricate long cylindrical vessels.

However, the process of welding two cylinders into a single long structure is quite difficult. For example, if the cylinders rolled are say 10 feet in diameter and 10 feet long, a reasonably perfect cylinder rarely emerges from the rolls, and the cylinders as rolled are typically "oval" to a greater or lesser degree. If the metal thickness is ½ inch and if the ovalling causes the cylinder diameter to be say 3 inches greater at one point that at another it is impossible to mate the ½ inch metal thicknesses in preparation for welding them together at the point of abutment. The normal procedure has been to apply impulsive forces by sledge hammer or otherwise to force an oval cylinder into a circular cylinder, but this is very time consuming and difficult to control.

SUMMARY OF THE INVENTION It is a primary object of this invention to provide an apparatus and method for fabricating long cylindrical vessels from two or more short rolled cylinders by butt welding the individual cylinders.

It is a further object of this invention to provide apparatus and method for facilitating the forming of the rolled cylinders into a more circular form when they are out of concentricity so that a more perfect mating of the ends of the two cylinders at the plane of butt welding can be facilitated.

These and other objects are realized and the limitations of the prior art are overcome in this invention by providing an apparatus which comprises substantially a horizontal boom which is supported on trolleys so that it can be moved a selected distance along a cylindrical rolled section. Means are provided for supporting the cylinders in parallel rollers so that they can be rotated about their own central axis. Means are provided for positioning the cylinders in front of the boom and preparing a post, wall or other restraining means on the opposite side to restrain the cylinder. Hydraulic means are provided to press a face plate against the near side of the cylinder to force it against the wall in order to reduce the horizontal diameter of the cylinder, as necessary.

Two rolled cylinders are provided of selected length and of the same nominal diameter, each mounted on two pairs of rollers, which are assembled on a single plate, so that the two cylinders can each be rotated about a common axis. If the cylinders are not perfectly circular when two ends are abutted, they will not match perfectly. The object then is to use the hydraulic cylinder on the boom to press one side of one cylinder against the restraining walls so as to reduce its horizontal diameter to match that of the adjacent cylinder. When the two cylinders are of equal diameter in the given plane, they are tack welded. The assembly of the two cylinders is then rotated until a diameter of one is found to be greater than the other, the boom is then applied to the cylinder of the larger diameter and it is squeezed to the point where its diameter matches the diameter of the adjacent cylinder, and the two edges are tack welded again. This process is repeated until the two cylinders are substantially of equal diameter at each point around the circumference. The complete butt joint is then welded.

The boom is supported at a hinge point and diagonal screw means provided so that it can be raised and lowered in accordance with the diameters with the rolled sections.

BRIEF DESCRIPTION OF THE DRAWINGS

These and other objects and advantages of the invention and a better understanding of the principles and details of the invention will be evident from the following description taken in conjunction with the appended drawings in which.

DESCRIPTION OF THE PREFERRED EMBODIMENT

Figure 1:
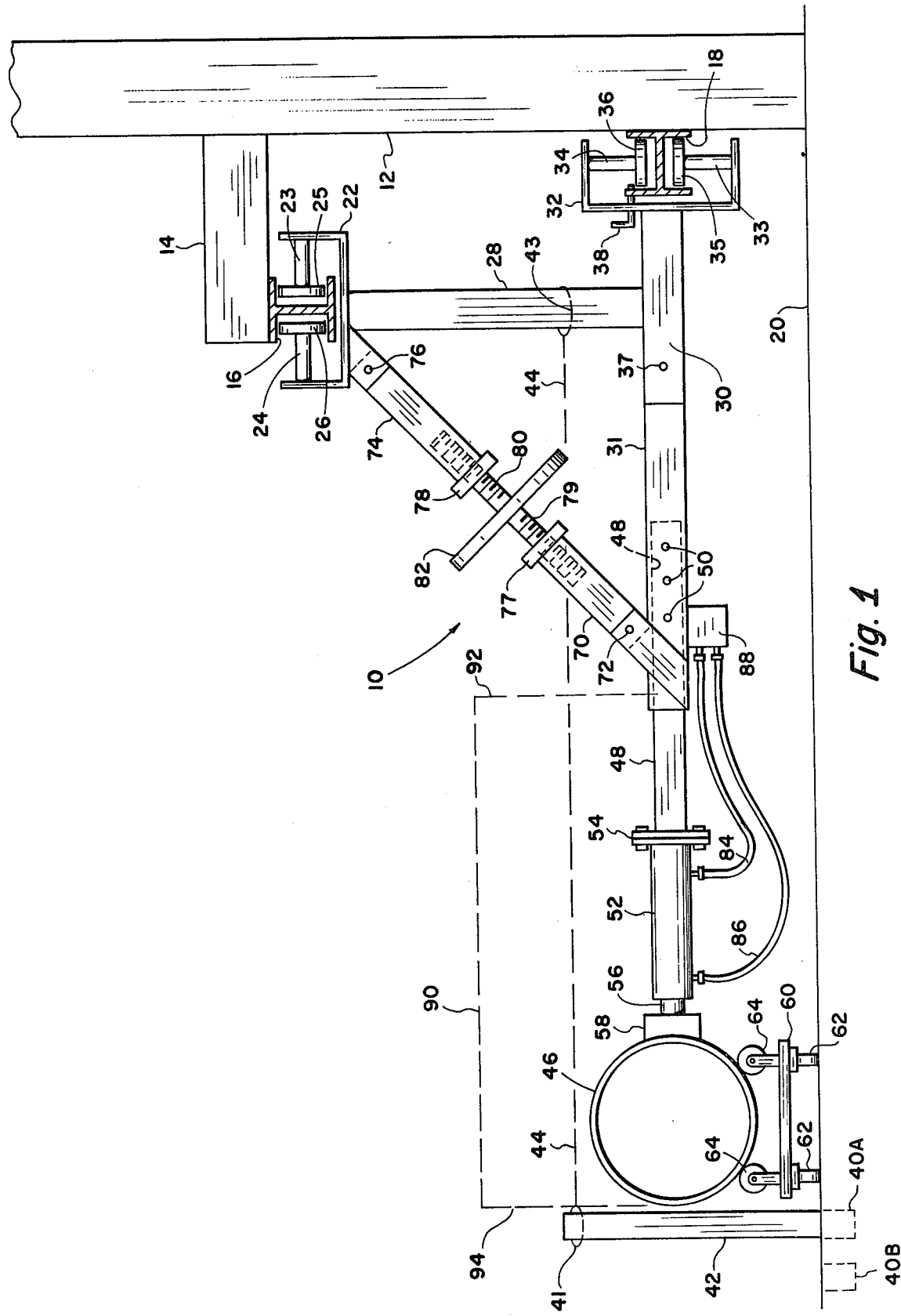
FIG. 1 illustrates an overall elevation view of the apparatus as applied to a particular rolled cylinder.

Referring now to the drawings and in particular to FIG. 1, there is shown one embodiment of the apparatus illustrated generally by the numeral 10. There is a wall 12, which can be a simple fabricated vertical structure which supports a pair of spaced apart beams 14 projecting from the wall, which supports a horizontal H beam 16 which serves as a trolley rail to support the apparatus. There is a second H beam 18, which is attached to the wall, and serves as a second rail for guiding and supporting the apparatus.

The apparatus comprises a vertical column 28 and a horizontal beam 30 which have attached at their ends U structures 22 and 32 respectively. These U structures have shafts 23, 24 carrying rollers 25 and 26 in the structure 22, and have shafts 33, 34 carrying rollers 35 and 36 in the structure 22. These U structures may have considerable length in a direction perpendicular to the plane of the drawing, so that there is some directivity to the boom, in plan view, that keeps it substantially perpendicular to the H beams. Means 38 are provided for locking one of the U frames 32 to the H beam 18, such as by means of matched holes and a pin 38, for example.

Figure 4:
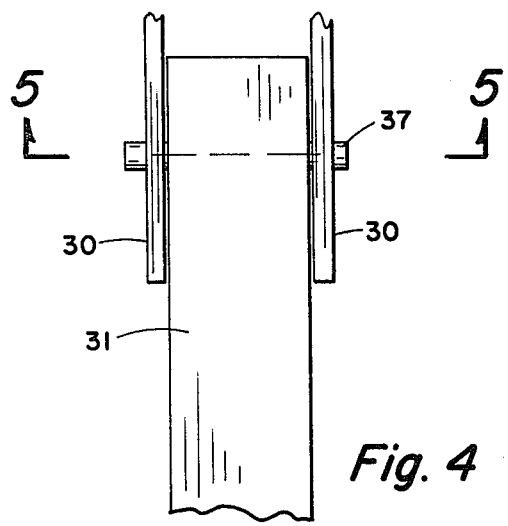
FIGS. 4 and 5 illustrates a detail of the hinge of the boom.
Figure 5:
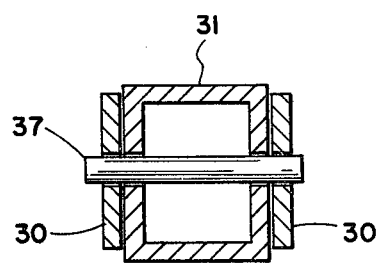

The beam 30 illustrated in FIGS. 4 and 5 comprise two spaced apart straps in vertical planes, which are attached as by welding to the bottom of column 28, in the form of an inverted T. The straps support a square tubing beam 31 by means of a pin 37. This permits lowering and raising of the boom 31 from a horizontal position to a selected angle above, or below the horizontal, to adjust for the diameter of the cylindrical walled sections 46 which are to be compressed by means of the hydraulic cylinder and piston. There is a coaxial beam 48 which is adapted to slide inside of the square tubing 31, and to be locked at selected position by means of a pin which passes through openings 50, as is well known in the art.

Attached to the outer end of the beam 48 is a coupling 54 to which is attached the hydraulic cylinder 52 which carries a piston rod 56 and a face plate 58. The face plate 58 has an outer face which is concave, to a selected radius of curvature. The face plates are interchangeable, and the apparatus can be provided with a face plate having the radius of curvature of the cylinder 46 to which it is to be pressed. Appropriate pressure fluid conduits 84 and 86 are provided between the cylinder 52, and a hydraulic control station 88. A source of pressurized fluid (not shown) is provided in a manner that is well known in the art, and further detail is not required.

There is a diagonal pair of arms 70 and 74 which are attached by pins 72 and 76 respectively to the structure, so that the boom 48 and 31 can be supported at any desired horizontal angle. The support members 70 and 74 have right and left handed threaded nuts 77 and 78 welded to their ends. There is a rod which is threaded at one end 79 with a left handed thread, and 80 which is threaded with a right handed thread. There is a hand wheel or other means 82 for rotating the threaded rod 79, 80, so that the length of the combination of 70, 79, 80, 74 can be increased or decreased as desired.

The component cylindrical shells 46A, 46B, which previously have been rolled and are of nominal length, say 10 feet for example, are placed end to end on an assembly comprising a horizontal plate 60 supplied with casters 62, with four pairs of rollers 64 mounted in such a way that they support cylinders of any diameter with a horizontal axis. If the two cylinders are of the same diameter, they will be coaxial.

Figure 2:
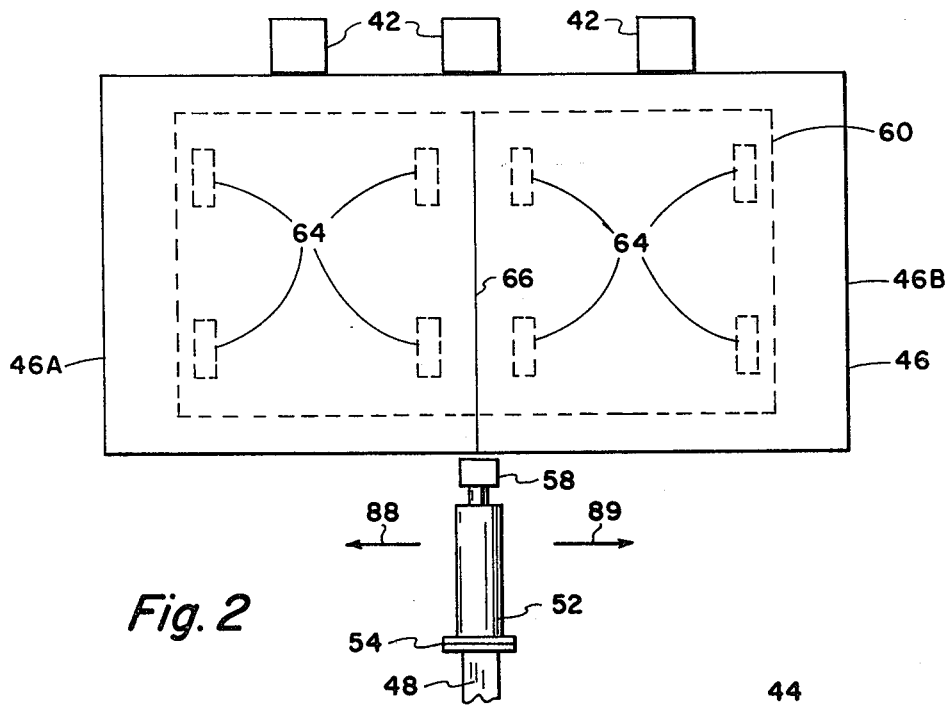
FIG. 2 illustrates the apparatus for supporting the two rolled cylindrical sections coaxially.

In FIG. 2 are shown two cylindrical elements 46A and 46B which have been rolled from steel plate and are nominally the same diameter. Each are supported on two pairs of rollers 64 so that the ends butt on the plane 66. The plate 60 can be supported on casters 62 or other means, so it can be readily positioned in front of the beam. The cylinder 52 and face plate 58 can be moved in the directions, 88, 89 as desired.

Figure 3:
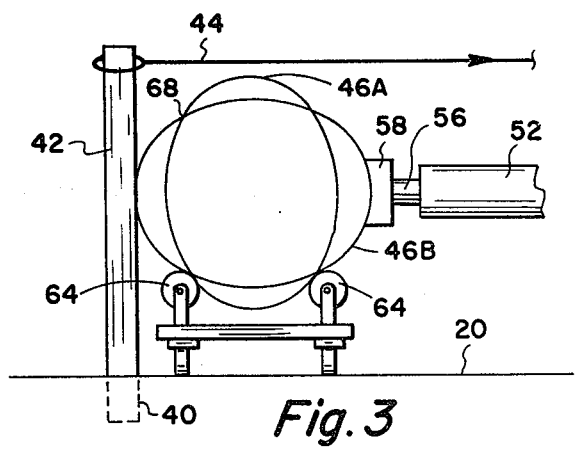
FIG. 3 illustrates the process of minimizing the out of circularity of the individual sections.

Referring to FIG. 3, there is illustrated to a greatly exaggerated extent, a situation where the two cylindrical shells 46A, 46B that have been rolled, are not perfectly circular. Therefore when the two shells have been placed on the rollers, they are adjusted end to end, and one is rotated with respect to the other, to determine whether there is a position of best fit of the oval conditions, if they cannot be matched perfectly at each point. It is not absolutely necessary to get the cylinders perfectly circular. The important point in the fabrication is that the two cylindrical shells must have the same eccentricity, so that the walls will mate, one against the other, at all points on the circumference, so that a perfect weld can be provided. Thus, if the two parts 46A and 46B can be rotated so that the two ovals fit each other perfectly then that is all that is required and the welds can be made.

After the best fit is determined, it will generally be found that one or the other shell might be a few inches greater in diameter than the other. In other words, the horizontal diameter of 46B may be greater than the horizontal diameter of 46A, as illustrated. The object then is to use the hydraulic cylinder 52 and the piston rod 56 and face plate 58, to compress the cylinder of largest horizontal diameter 46B between the face plate 58 and the restraining members 42, to reduce that diameter until it matches the horizontal diameter of the shell 46A, for example. When the diameters are equal, that is, when the walls of the shells at those two diameters, are in a sense colinear with each other, tack welds are provided to hold those points together. The assembly is rotated on the rollers 64 until another position is found where the diameter of one is greater than the diameter of the other. The boom is then rolled horizontally along the trolley 16 to the position where it can compress the shell which needs to be reduced in diameter, and the hydraulic force is then applied to reduce that diameter until it equals the diameter of the outer shell, and then additional tack welds are provided, and so on, until the two cylinders have been perfectly matched at each point along the circumference. Then a complete circumferential weld is made.

The restraining means 42 may be one or a plurality of posts, as shown or they can be a rigid structure attached to the floor, or attached to the wall 12. Adjustment for different diameters of cylinders is provided by the boom members 48 and 31. However, if additional range is required it can be done by using a plurality of holes 40A, 40B in the floor etc. for support of the posts. The upper ends of the posts may be restraind by tensile members such as chains 44 attached to yokes or rings 41 and 43, on the posts 42 and the vertical support member 28, for example.

In place of the posts 42, it may be desirable to construct a tensile member illustrated by the dashed line 90 which has a vertical member 92 attached to the boom arm 31, a horizontal member 90, and a downgoing vertical member 94. So that as the apparatus moves laterally along the trolley 16, the restraining arm 94 is always aligned with the boom 31.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. The method of fabricating long circular cylindrical shells out of two short cylindrical shells, of substantially the same diameter, comprising the steps of;
   (a) placing said shells on a means for holding the two shells in abutting relation, and substantially coaxial;
   (b) relatively rotating one shell with respect to the other to match whatever out-of-roundness exists;
   (c) if the diameter of one shell is greater than that of the other in a common first diametral plane, applying a force in said first plane to reduce said greater diameter, until the diameters of both shells in said plane are substantially the same;
   (d) tack welding the two shells at the ends of the diameter in said first plane;
   (e) rotating the shells together until a second diametral plane is found where the diameter of one shell is larger than that of the other, and applying force in said second plane to said one shell to reduce its diameter to that of the other, and tack welding the two shells at the ends of the diameters in said second plane;

(f) repeating step (e) until the two shells have substantially the same diameters in all diametral planes; and (g) girth welding the butt joint between the two shells.

2. Apparatus for fabricating long circular cylindrical shells out of at least two short shells of the same diameter, comprising;

(a) a nominally horizontal boom; moveably supported at a first end to a first wall;

(b) means to adjust the length of said boom;

(c) means to tilt said boom up and down from said nominal horizontal position;

(d) means to support said boom so that it can be moved horizontally in a direction perpendicular to its length;

(e) colinear hydraulic means at the second end of said boom to extend its length incrementally;

(f) means to support two circular cylindrical shells, nominally of the same diameter in a coaxial position, with ends abutting; and means to rotate said shells independently about their common axis;

(g) a second wall parallel to said first wall and spaced from the second end of said boom by a selected distance, both walls above to resist substantially horizontal forces tending to force them apart;

whereby when at least one of said shells is placed between said second wall and said hydraulic means on said second end of said boom, said hydraulic means can exert a horizontal force on said shell to reduce its horizontal diameter.

3. The apparatus as in claim 2 in which said means to support said boom comprises;

(a) a first horizontal rail attached parallel to said first wall at a selected height;

(b) a short column and roller means supported from, and adapted to run along said first rail;

(c) a second horizontal rail attached parallel to said first wall at the level of said short column;

(d) a stub horizontal beam and rollers supported from and adapted to run along said second rail;

(e) said short column and said stub beam attached in inverted T relation;

(f) said boom hinged at its first end to said stub horizontal beam; and (g) adjustable diagonal means hinged to the top of said short column, and to said boom, to adjustably support said boom at a selected angle.

4. The apparatus as in claim 3 in which said diagonal member includes a threaded rod with right and left-handed threads, to shorten or lengthen said diagonal member.

5. The apparatus as in claim 2 in which said boom comprises two parts which telescope, one within the other, and means to lock said two parts together at selected positions.

6. The apparatus as in claim 2 in which said second wall includes at least one post inserted into the floor.

7. The apparatus as in claim 6 including tensile means tieing said at least one post to said means to support said boom.

* * * * *